(12) United States Patent
Cheng (10) Patent No.: US 11,851,931 B2
(45) Date of Patent: Dec. 26, 2023

(54) KITCHEN APPLIANCE WITH LID

(71) Applicant: KONINKLIJKE PHILIPS N.V., Eindhoven (NL)

(72) Inventor: Chi Kuen Cheng, Eindhoven (NL)

(73) Assignee: VERSUNI HOLDING B.V., Eindhoven (NL)

( * ) Notice: Subject to any disclaimer, the term of this patent is extended or adjusted under 35 U.S.C. 154(b) by 0 days.

(21) Appl. No.: 17/918,886

(22) PCT Filed: Dec. 7, 2021

(86) PCT No.: PCT/EP2021/084548
§ 371 (c)(1),
(2) Date: Oct. 13, 2022

(87) PCT Pub. No.: WO2022/128613
PCT Pub. Date: Jun. 23, 2022

(65) Prior Publication Data
US 2023/0304337 A1    Sep. 28, 2023

(30) Foreign Application Priority Data

Dec. 18, 2020  (WO) ................ PCT/CN2020/137642
Feb. 15, 2021  (EP) ..................................... 21157019

(51) Int. Cl.
*E05D 3/14*         (2006.01)
*E05D 3/18*         (2006.01)
(Continued)

(52) U.S. Cl.
CPC ........... *E05D 3/14* (2013.01); *A47J 27/21175* (2013.01); *E05D 3/18* (2013.01); *E05F 1/12* (2013.01); *E05Y 2900/30* (2013.01)

(58) Field of Classification Search
CPC ......... A47J 27/21175; E05F 1/12; E05F 1/10; E05F 1/1041; E05F 1/1091; E05F 1/14;
(Continued)

(56) References Cited

U.S. PATENT DOCUMENTS 1,838,898 A * 12/1931 Aldeen ..................... E05D 3/18
                                                          5/57.1
1,864,164 A *  6/1932 Aldeen ..................... E05D 3/18
                                                          5/57.1
(Continued)

FOREIGN PATENT DOCUMENTS

CN          101103170 A       1/2008
CN          102452536 A       5/2012
(Continued)

OTHER PUBLICATIONS

Extended European Search Report issued in connection with corresponding EP Application No. 21157019.7 dated Jul. 14, 2021.

*Primary Examiner* — Justin B Rephann
(74) *Attorney, Agent, or Firm* — Maschoff Brennan (57) ABSTRACT

A kitchen appliance is described. The kitchen appliance has a chamber delimited by a wall arrangement and a lid for sealing the chamber. The lid is attached to the wall arrangement through a hinge mechanism having an arm and a further arm. The arm has a first terminal portion attached to the wall arrangement through a first pivot proximal to a first end portion of the lid and an opposing second terminal portion attached to an intermediate portion of the lid through a second pivot. The further arm has a first further terminal portion attached to an intermediate portion of the arm in between the first terminal portion and the second terminal portion through a third pivot and a second further terminal portion terminating in a sliding arrangement on the lid in between the second pivot and the first end portion of the lid.

14 Claims, 7 Drawing Sheets

(51) Int. Cl.
*A47J 27/21* (2006.01)
*E05F 1/12* (2006.01)

(58) Field of Classification Search
CPC .... E05D 3/06; E05D 3/00; E05D 3/18; E05D 3/14; Y10T 292/1055; Y10T 292/1076; E05Y 2900/30
See application file for complete search history.

(56) References Cited

U.S. PATENT DOCUMENTS

| | | | | |
|---|---|---|---|---|
| 2,031,526 | A * | 2/1936 | Demuth | E05D 3/186 16/370 |
| 2,173,644 | A * | 9/1939 | Blackmore | E05D 3/18 16/369 |
| 7,178,202 | B2 * | 2/2007 | Hirtsiefer | E05D 15/46 16/366 |
| 7,934,293 | B2 * | 5/2011 | Kalargeros | B60R 21/38 16/369 |
| 7,976,079 | B2 * | 7/2011 | Hirtsiefer | E05D 15/463 292/262 |
| 8,904,709 | B2 * | 12/2014 | Ajiki | E05F 1/14 49/246 |
| 10,087,669 | B1 * | 10/2018 | Gnadinger | B67D 1/08 |
| 10,823,428 | B2 * | 11/2020 | Jadhav | E05D 15/46 |
| 2002/0166208 | A1 | 11/2002 | Kondo et al. | |
| 2009/0072551 | A1 * | 3/2009 | Hirtsiefer | E05D 15/46 292/196 |
| 2012/0037629 | A1 | 2/2012 | Morgan et al. | |

FOREIGN PATENT DOCUMENTS

| | | |
|---|---|---|
| CN | 203244280 U | 10/2013 |
| CN | 105163634 A | 12/2015 |
| CN | 105193277 A | 12/2015 |
| CN | 206473189 U | 9/2017 |
| CN | 207784941 U | 8/2018 |
| CN | 110678114 A | 1/2020 |
| CN | 111248739 A | 6/2020 |
| CN | 211657940 U | 10/2020 |
| CN | 111954480 A | 11/2020 |
| DE | 19517623 A1 | 11/1996 |
| DE | 102012020631 A1 | 4/2014 |
| EP | 1615532 B1 | 12/2006 |

\* cited by examiner

KITCHEN APPLIANCE WITH LID

CROSS-REFERENCE TO RELATED APPLICATIONS

The present application is a U.S. National Phase application under 35 U.S.C. § 371 of International Application No. PCT/EP2021/084548, filed on Dec. 7, 2021, which claims the benefit of International Application No. PCT/CN2020/137642, filed on Dec. 18, 2020, and European Patent Application No. 21157019.7, filed on Feb. 15, 2021. These applications are hereby incorporated by reference herein.

FIELD OF THE INVENTION

The present invention relates to a kitchen appliance comprising a chamber delimited by a wall arrangement and a lid for sealing said chamber, wherein the lid is attached to the wall arrangement through a hinge mechanism including a pivot.

BACKGROUND OF THE INVENTION

Many kitchen appliances, such as electric kettles, have lids that are attached to the housing or wall arrangement of the kitchen appliance through an arm that is mounted to the wall arrangement through a pivot allowing the lid to swivel away from the wall arrangement to provide access to the chamber such as a food processing chamber, a reservoir for boiling water and so on. This swivel motion typically is a circular motion around the pivot, which may involve an arm such as a curved arm attached to the pivot, which extends from the wall arrangement to move the lid away from the access (opening) to the chamber. Such pivot mechanisms typically require the lid to be sitting on top of the chamber in its closed position.

In the open position, the hinge mechanism of the lid tends to partially obscure the access to the chamber. This is of little concern when filling the chamber, as the access aperture typically is large enough to allow such filling, but can become cumbersome if for whatever reason a user wants to manually access the chamber, e.g. for cleaning purposes, in which case such access can be impeded by the partial blockage of the access by the hinge mechanism.

SUMMARY OF THE INVENTION

The present invention seeks to provide a kitchen appliance in which a lid for sealing the chamber can be opened in such a manner that easier access to the chamber is provided.

According to an aspect, there is provided a kitchen appliance comprising a chamber delimited by a wall arrangement and a lid for sealing said chamber, wherein the lid is attached to the wall arrangement through a hinge mechanism comprising an arm having a first terminal portion attached to the wall arrangement through a first pivot proximal to a first end portion of the lid and an opposing second terminal portion attached to an intermediate portion of the lid through a second pivot, said intermediate portion being proximal to a second end portion of the lid opposing said first end portion; and a further arm having a first further terminal portion attached to an intermediate portion of the arm in between the first terminal portion and the second terminal portion through a third pivot and a second further terminal portion terminating in a sliding arrangement on the lid in between the second pivot and the first end portion of the lid.

The application of such a hinge mechanism between the lid and the wall arrangement of the kitchen appliance ensures that the lid can be extended away from the opening of the chamber, thereby providing better access to the chamber through such an opening. More specifically, the arm attached to the first pivot allows for the lid to be rotated away from the opening in the kitchen appliance, whereas the further arm allows for the angle of the lid relative to the second pivot to be altered in a controlled manner, thereby allowing the lid to be tilted away from the opening of the chamber. Moreover, the further arm in some embodiments can prevent an end portion of the lid from catching the wall arrangement upon opening the lid, thereby providing a particularly smooth opening mechanism for the lid.

Upon release from the wall arrangement, e.g. upon a user opening the lid through activating a release mechanism, the user may manually operate the hinge mechanism to remove the lid from the chamber such as to provide access to the chamber. However, in a preferred embodiment, the first pivot comprises a torsion spring arranged to force the lid from the chamber upon release of the lid from the wall arrangement such that the lid is automatically moved from the chamber by the torsion spring when the lid is opened. More preferably, the hinge mechanism further comprises a further spring extending between a point on the arm in between the intermediate portion and the second terminal portion and the sliding arrangement such that the angle of the lid is also automatically adjusted when the lid is opened. Such a further spring for example may be a tension spring or a compression spring that is tensioned or compressed when the lid is closed.

In an example embodiment, the first pivot and the second pivot each are arranged to pivot in a single plane such as to control the direction in which the lid opens when released from the chamber of the kitchen appliance. For instance, the first pivot may comprise a mounting bracket on the wall arrangement into which the first terminal portion is rotatably mounted to provide a robust first pivot, whereas the second pivot may comprise a further mounting bracket on the lid into which the second terminal portion is rotatably mounted to provide a robust second pivot.

Similarly, the third pivot may be arranged to pivot in a single plane such as to control the change in angle of the lid when it rotates around the third pivot. To this end, the intermediate portion of the arm for example may comprise a recess into which the first further terminal portion of the further arm is rotatably mounted to define the third pivot in order to provide a robust third pivot.

The sliding arrangement may comprise a pair of guide rails into which the second further terminal portion is mounted such that the second further terminal portion can slide between opposing ends of said guide rails, thereby controlling the range of change in the orientation or angle of the lid, which helps to protect the lid from accidental damage, e.g. caused by over rotation.

In a preferred embodiment, the wall arrangement comprises a step below said lid, said step carrying a mounting arrangement including the first pivot such that said mounting arrangement is located in between said step and the lid. This allows for a free swivelling action of the lid without the lid impeding access to the chamber when opened, which therefore is a particularly suitable arrangement to allow access to the chamber.

The lid may be recessed within said wall arrangement when said lid is closed in order to provide a particularly clean design of the kitchen appliance.

Although the kitchen appliance may take any suitable shape, in at least some embodiments, the kitchen appliance is an electric kettle.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

It should be understood that the Figures are merely schematic and are not drawn to scale. It should also be understood that the same reference numerals are used throughout the Figures to indicate the same or similar parts.

Figure 1:
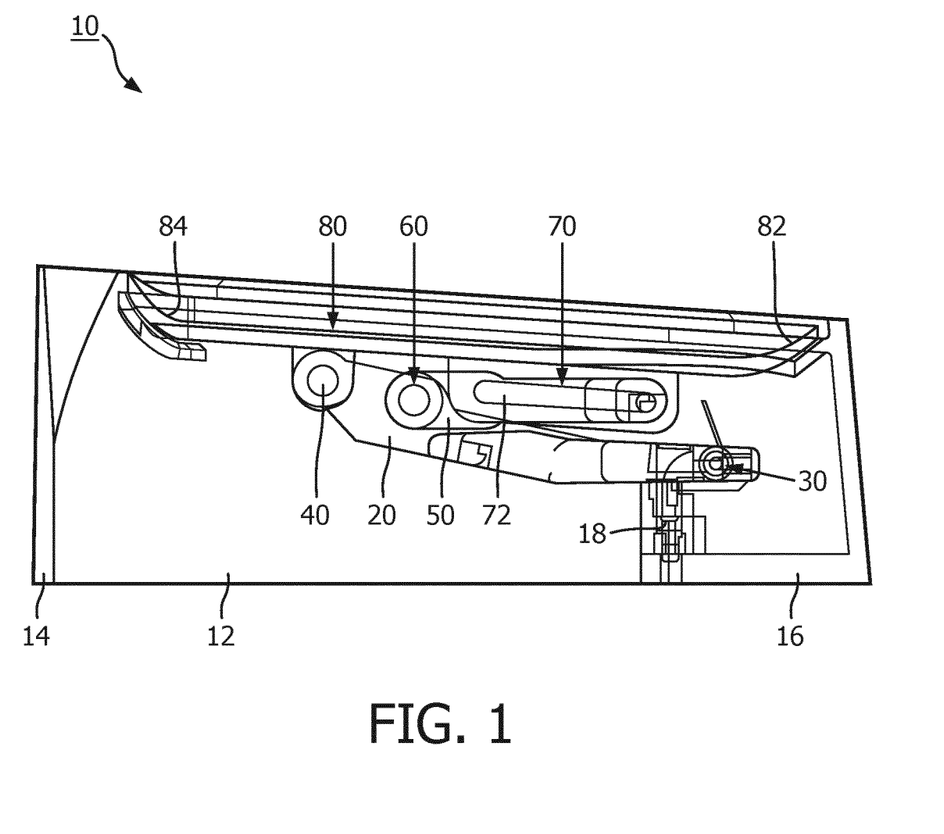
FIG. 1 schematically depicts a cross-sectional view of part of a kitchen appliance according to an embodiment with its lid in a closed position.
Figure 2:
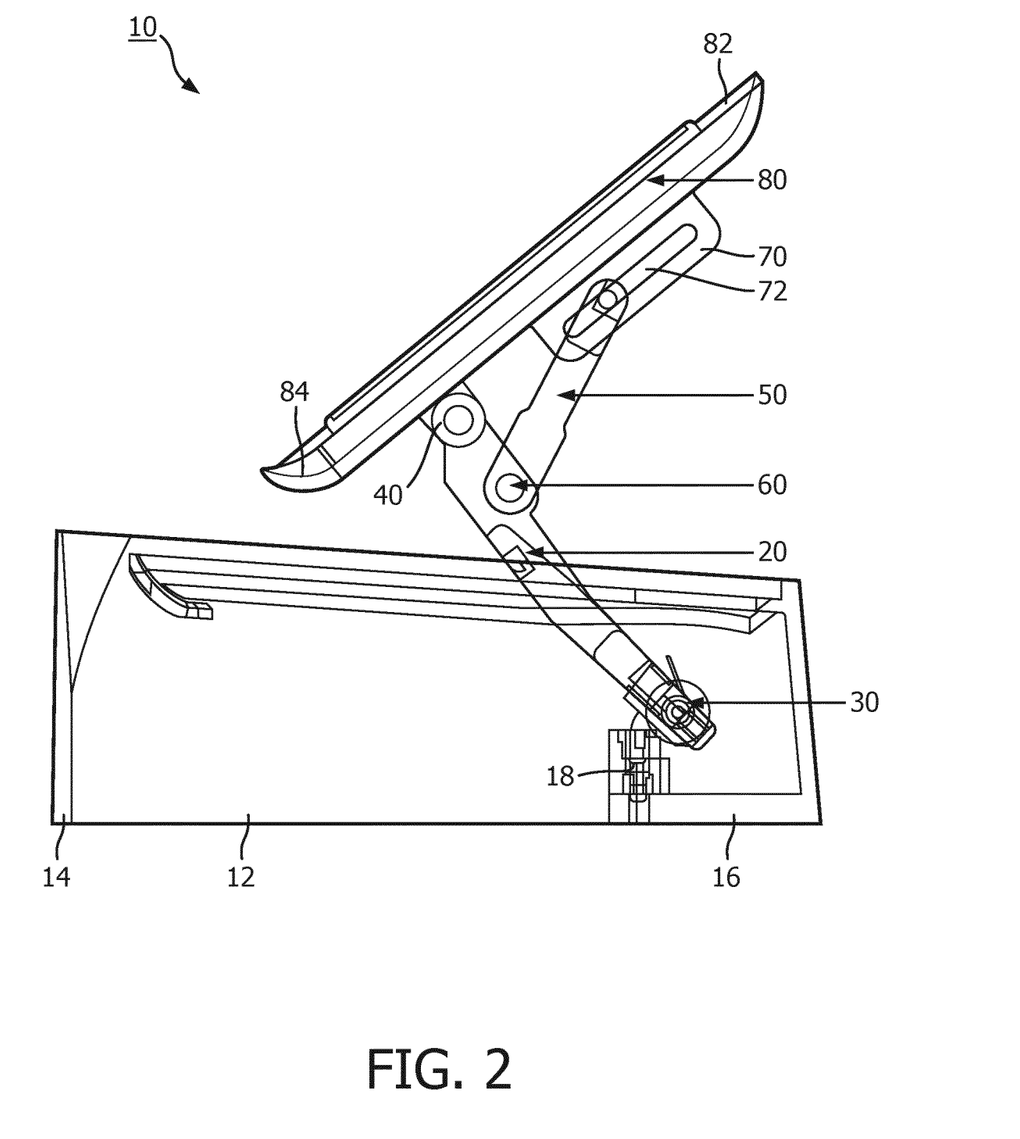
FIG. 2 schematically depicts a cross-sectional view of part of a kitchen appliance according to an embodiment with its lid in a partially opened position.
Figure 3:
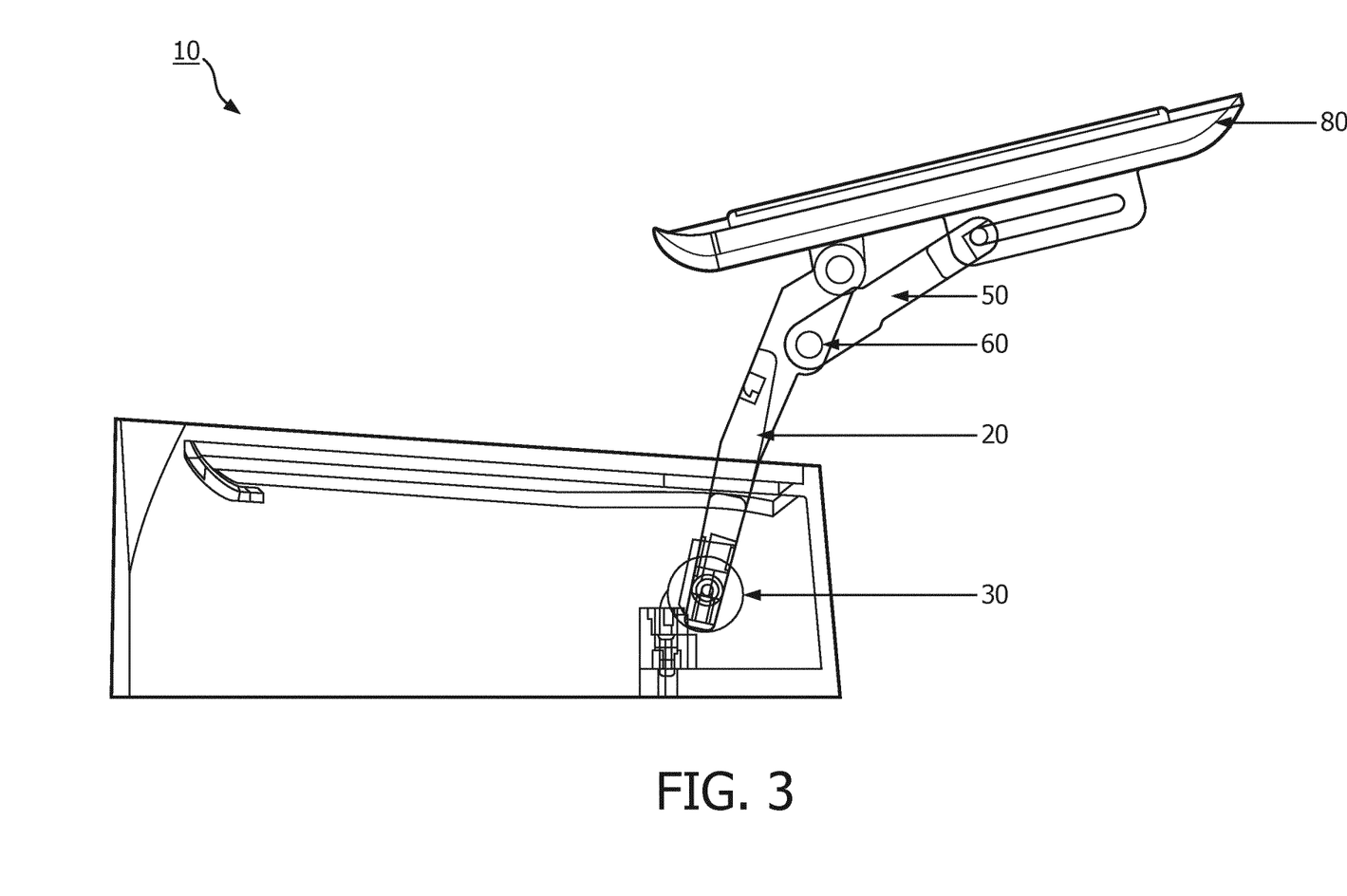
FIG. 3 schematically depicts a cross-sectional view of part of a kitchen appliance according to an embodiment with its lid in a fully opened position.

FIG. 1-3 schematically depict an upper section of a kitchen appliance 10 such as an electric kettle or the like in which a lid 80 is fitted over an aperture of a chamber 12 delimited by a housing or wall arrangement 14. The wall arrangement 14 may be made of any suitable material, e.g. plastic, metal, a composite material or any combination of suitable materials. The chamber 12 typically further comprises some element (not shown) for interacting with the contents of the chamber, e.g. a heating element in case of the kitchen appliance 10 being an electric kettle, a cutting or mixing blade arrangement in case of the kitchen appliance 10 being a food processor or a blender, and so on. This element may take any suitable form and embodiments of the present invention are not limited to a particular type of element.

In FIG. 1, the lid 80 is in a closed position and in FIG. 2, the lid 80 is opening, with FIG. 3 depicting the lid 80 in its fully opened position. The lid 80 is mounted to the wall arrangement 14 through a hinge mechanism including a system of pivots such that the lid 80 can swivel away from the chamber 12 such that relatively unimpeded access to the chamber 12 is provided. To this end, the hinge mechanism comprises a first arm 20, which is attached at a first end to a first pivot 30 connecting the first arm 20 to the wall arrangement 14 and is attached at a second end opposing the first end to a second pivot 40 on a bottom surface of the lid 80, i.e. the surface that faces the chamber 14 when the lid 80 is in the closed position. The second pivot 40 is typically positioned at an intermediate location at the bottom surface of the lid 80 in between a first end portion 82 and a second end portion 84 of the lid 80, with the second pivot 40 being located closer, i.e. proximal, to the second end portion 84 of the lid 80.

The hinge mechanism further comprises a further arm 50 having a first further terminal portion 52 attached to an intermediate portion of the arm 20 in between the first pivot 30 and the second pivot 40, and typically closer to the second pivot 40 than to the first pivot 30. The further arm 50 is attached to the first arm 20 through a third pivot 60 allowing the further arm 50 to rotate relative to the first arm 20. The opposite end of the further arm 50 terminates at a sliding arrangement 70 on the lid 80 in between the second pivot 40 and the first end portion 82 of the lid 80.

As can be seen from FIG. 2, upon release of the lid 80 from the chamber 12, e.g. by a user releasing the lid 80 using a release mechanism (not shown). Any suitable release mechanism may be used for this purpose, e.g. a button-triggered release mechanism or a release mechanism activated by pressing the lid 80 inwardly. As such release mechanisms are well-known per se, this will not be discussed for the sake of brevity only. Upon such a release of the lid 80 from the chamber 12, the first arm 20 allows for the lid 80 to be lifted up by clockwise rotation of the first arm 20 around the first pivot 30 in the view in FIG. 2, whereas anticlockwise rotation in the view in FIG. 2 around the second pivot 40 as controlled by the further arm 50 initially forces the lid 80 in a more vertical orientation with its second end portion 84 pointing more towards the chamber 12 such as to ensure that the second end portion 84 does not catch the wall arrangement 14 upon such a release. This for instance is particularly relevant if the lid 80 lies recessed within the wall arrangement 14 delimiting the chamber 12 in the closed position shown in FIG. 1. The amount by which the second end portion 84 of the lid 80 can be pushed downward is controlled by the length of the sliding arrangement 70 as the downward motion of the second end portion 84 of the lid 80 is caused by the further arm 50 sliding between opposing end points of this sliding arrangement, which forces an anticlockwise rotation of the lid 80 around the second pivot 40 in the view in FIG. 2. In example embodiments, the sliding arrangement 70 comprises a pair of opposing guide rails 72 in between which the further arm 50 may be mounted in a sliding fashion, but other suitable implementations of such a sliding arrangement 70 may also be contemplated.

In a preferred embodiment, the wall arrangement 14 comprises an inward step 16 below the first end portion 82 of the lid 80 in its closed position onto which the first pivot 30 is mounted. To this end, a mounting post 18 may extend upwardly from the inward step 16, with the first pivot 30 being formed at the other end of the mounting post 18. This mounting mechanism of the lid 80 onto the wall arrangement 14 provides a clearance between the mounting post 18 and the section of the wall arrangement 14 extending from the inward step 16 towards the rim delimiting the aperture of the chamber 12 that is sealed by the lid 80 in its closed position. Consequently, when the lid 80 opens, the first arm 20 can rotate around the first pivot 30 beyond a vertical orientation in its fully opened position as schematically depicted in FIG. 3, such that the lid 80 can be rotated away from the kitchen appliance 10 to clear the opened lid 80 from the chamber 12 such as to improve access to the chamber 12 when the lid 80 is opened.

Preferably, the first pivot 30, the second pivot 40 and the third pivot 60 each are deigned to pivot in a single plane, i.e. allow one-dimensional rotation only such as to provide a controllable and repeatable opening mechanism for the lid 80. However, other implementations, e.g. in which at least one of the first pivot 30, the second pivot 40 and the third pivot 60 has more degrees of freedom, e.g. by implementation as a ball joint or the like, may also be contemplated, although such alternative implementations are less preferred.

Figure 4:
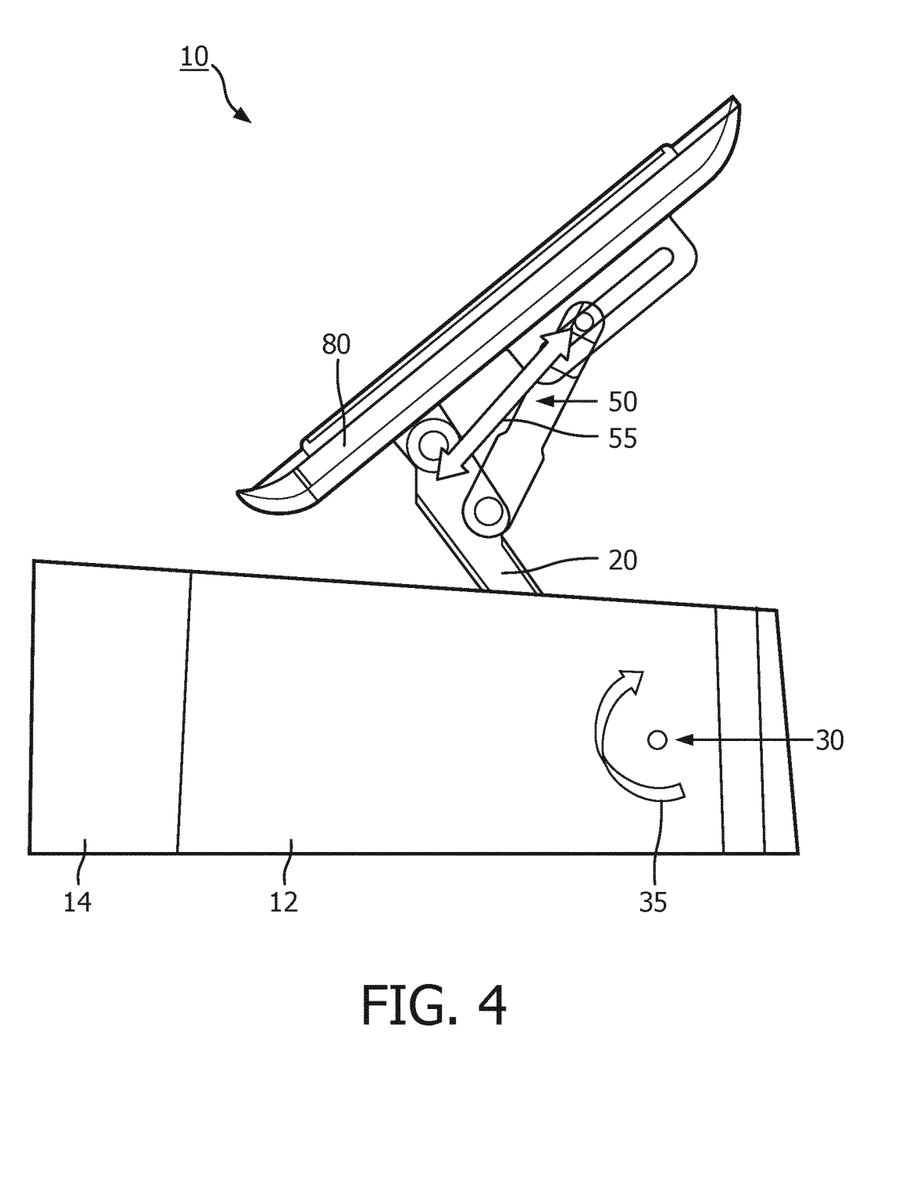
FIG. 4 schematically depicts a side view of part of a kitchen appliance according to an embodiment with its lid in a partially opened position.

The hinge mechanism of the lid 80 may be operated manually to release the lid 80 from the chamber 12. However, in a particular embodiment as shown in FIG. 4, the first pivot 30 includes a torsion spring 35 that is energized when the lid 80 is closed such that upon release of the lid 80, e.g. by operation of a release mechanism as previously explained, the first arm 20 is rotated away from the chamber 12 around the first pivot 30 by the release of energy stored in the torsion spring 35. Preferably, the hinge mechanism further comprises a further spring 55 extending between a point on the first arm 20 in between the second pivot 40 and the third pivot 60 and the sliding arrangement 70, which further spring 55 for example may be a tension spring or a compression spring that is energized when the lid 80 is closed such that upon release of the lid 80, the second arm 50 is forced to slide in the sliding arrangement 70 causing the anticlockwise rotation of the lid 80 around the second pivot 40 in the view in FIG. 2 when the lid 80 opens.

Figure 5:
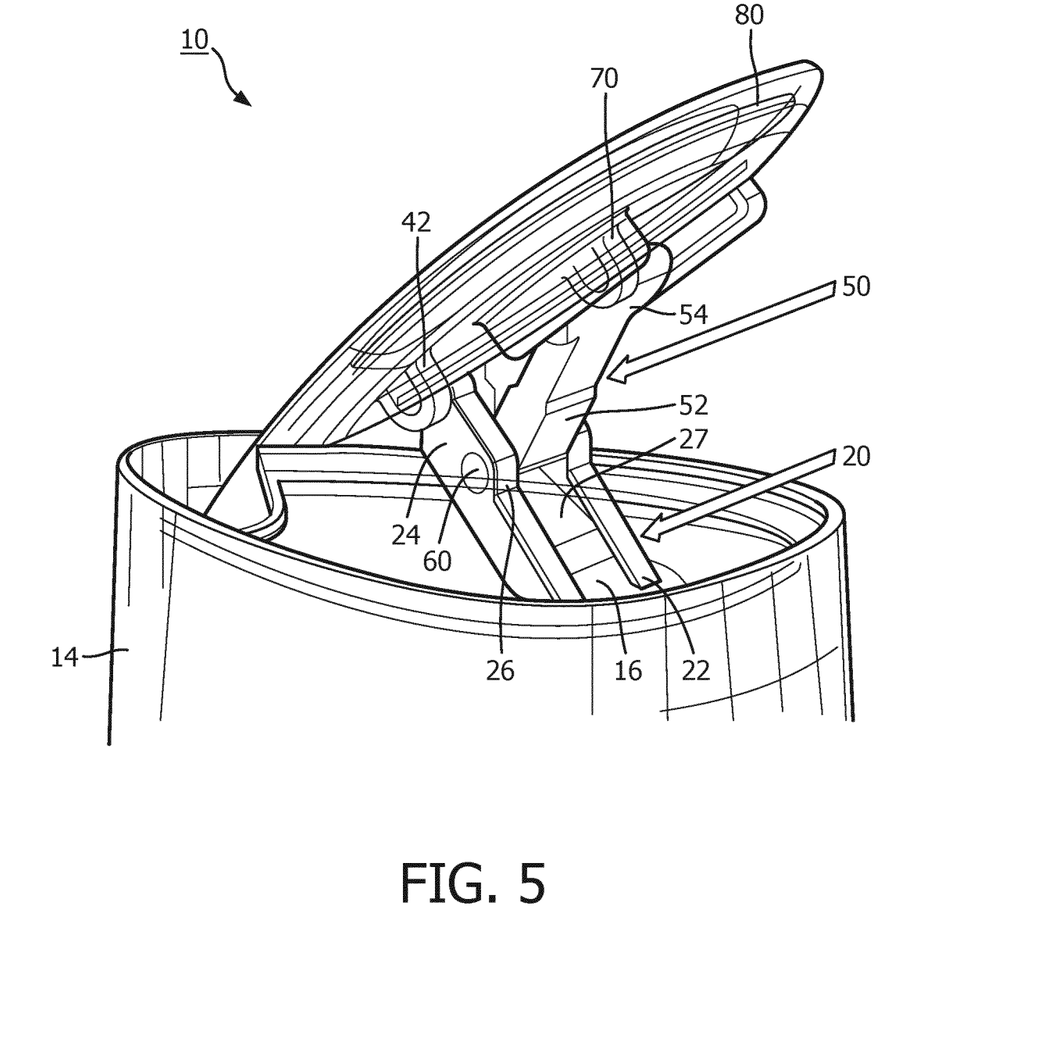
FIG. 5 schematically depicts a perspective view of part of a kitchen appliance according to an embodiment with its lid in an opened position.

FIG. 5 schematically depicts an upper part of the kitchen appliance 10, e.g. an electric kettle or the like as previously explained, in a perspective view to provide a detailed view of the way the first arm 20 and the second arm 50 are assembled in accordance with an example embodiment. A first terminal portion 22 of the first arm 20 is attached to the wall arrangement 14, e.g. mounted in a mounting bracket (not visible) on the inward step 16, to form the first pivot 30. The first arm 20 further comprises an opposing second terminal portion 24 attached to an intermediate portion of the lid to form the second pivot 40, e.g. mounted in a further mounting bracket 42 integral to the lid 80. The further mounting bracket 42 may take any suitable shape, e.g. a pair of spaced apart posts or the like in between which the second terminal portion 24 of the first arm 20 may be rotationally mounted to form the second pivot 40.

The further arm 50 has a first further terminal portion 52 attached to an intermediate portion 26 of the arm 20 in between the first terminal portion 22 and the second terminal portion 24 of the first arm 20 through the third pivot 60. The intermediate portion 26 of the first arm 20 may be shaped as a mounting bracket, e.g. comprise a pair of posts or the like spaced apart by a recess 27 in the first arm 20 into which the first further terminal portion of the further arm 50 is rotationally mounted to form the third pivot 60, although other ways of securing the further arm 50 to the first arm 20 will be immediately apparent to the skilled person. The further arm 50 further has a second further terminal portion 54 opposing its first further terminal portion 52 and terminating in the sliding arrangement 70 on the lid 80. For example, the second further terminal portion 54 may be mounted in the guide rails 72 of the sliding arrangement 70 such as to allow translation of the second further terminal portion 54 of the further arm 50 along the sliding arrangement 50.

Figure 6:
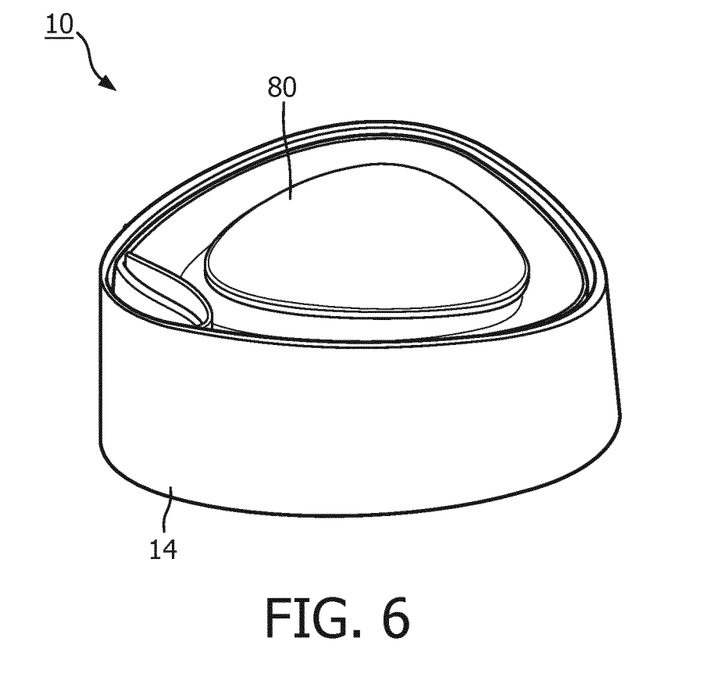
FIG. 6 schematically depicts a perspective view of part of a kitchen appliance according to an embodiment with its lid in a closed position.
Figure 7:
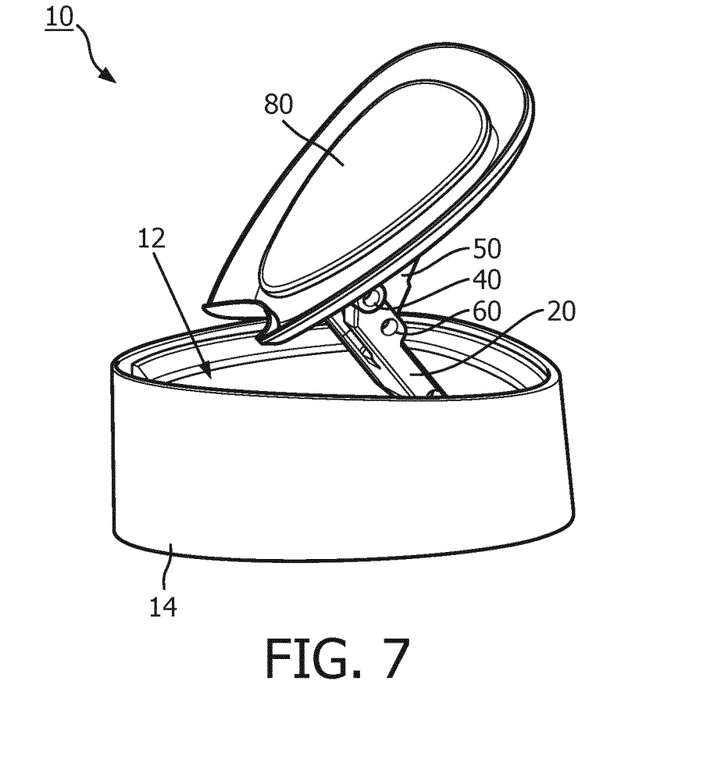
FIG. 7 schematically depicts another perspective view of part of a kitchen appliance according to an embodiment with its lid in an opened position.
Figure 8:
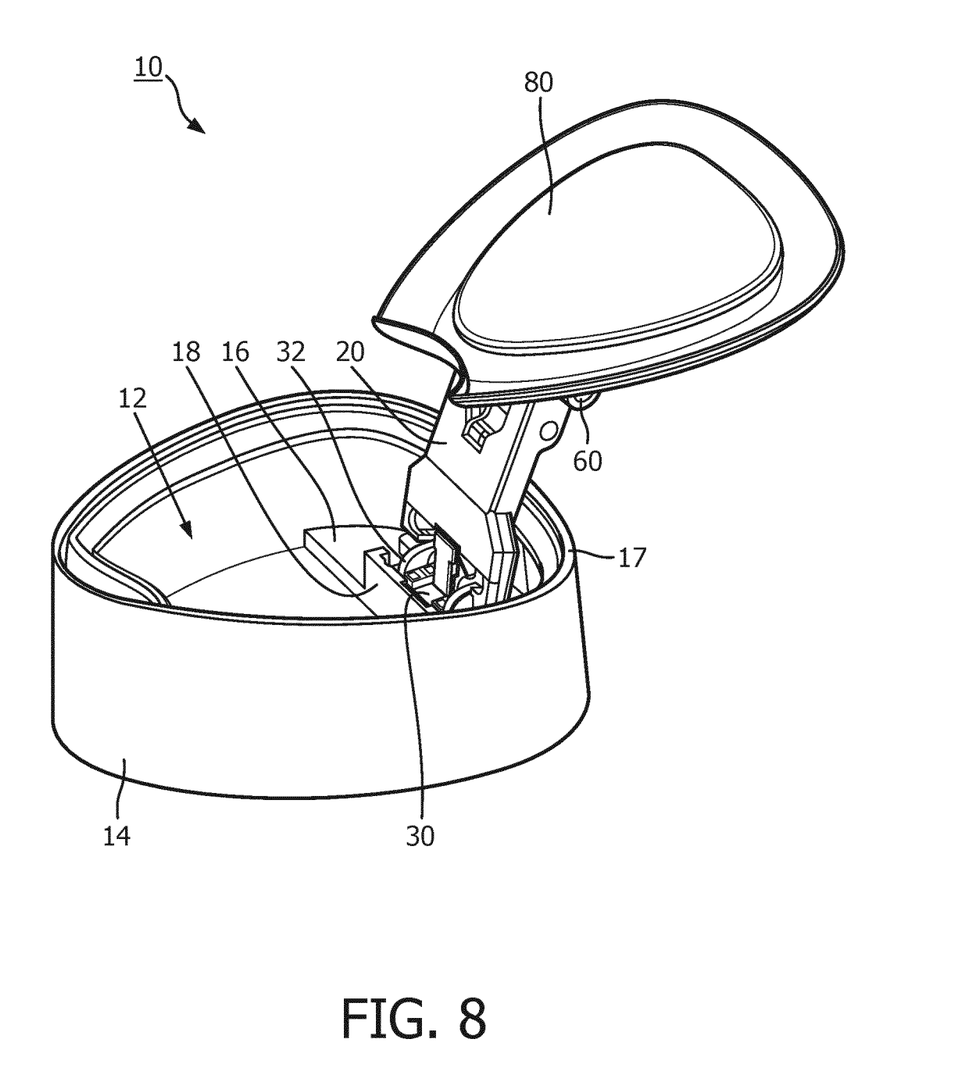
FIG. 8 schematically depicts yet another perspective view of part of a kitchen appliance according to an embodiment with its lid in an opened position.

FIG. 6-8 provide a perspective view of the upper portion of the kitchen appliance 10, e.g. an electric kettle or the like according to an example embodiment. In FIG. 6, the lid 80 lies in a closed potion slightly recessed within the wall arrangement 14 of the kitchen appliance 10. The slightly recessed orientation may be chosen for aesthetic reasons, but it should be understood that it is equally feasible for the lid 80 to sit on top of the wall arrangement 14 of the kitchen appliance 10 in its closed position.

In FIG. 7, the lid 80 is shown in its partially opened position, in which the lid 80 is rotated away from the chamber 12 through clockwise rotation of the first arm 20 around the first pivot 30 (not visible) under this viewing angle, and the second end portion 84 of the lid 80 is tipped towards the chamber 12 by the further arm 50 sliding in the sliding arrangement 70, causing an anticlockwise rotation of the lid 80 around the second pivot 40 under this viewing angle.

In FIG. 8, the lid 80 has fully opened by completion of the rotation of the first arm 20 around the first pivot 30. Preferably, the first arm 20 rotates beyond a vertical orientation as previously explained such that the lid 80 is rotated well clear from the opening to the chamber 12 such as to provide easy access to the chamber 12. This may be facilitated by the first arm 20 being mounted into a mounting bracket 32, e.g. a pair of spaced apart posts or the like into which the first terminal portion 22 of the first arm 20 is rotationally mounted in order to form the first pivot 30, which mounting arrangement may be formed on the mounting post 18 extending from the inward step 16 of the wall arrangement 14 such that a clearance exists between the first pivot 30 and the section of the wall arrangement 14 upwardly extending from the inward step 16, which clearance ensures that the first arm 20 can move beyond its vertical orientation before it collides with the rim 17 around the opening into the chamber 12.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A kitchen appliance comprising a chamber delimited by a wall arrangement and a lid for sealing said chamber, wherein the lid is attached to the wall arrangement through a hinge mechanism comprising:
   an arm having a first terminal portion attached to the wall arrangement through a first pivot proximal to a first end portion of the lid and an opposing second terminal portion attached to an intermediate portion of the lid through a second pivot, said intermediate portion being proximal to a second end portion of the lid opposing said first end portion; and
   a further arm having a first further terminal portion attached to an intermediate portion of the arm in between the first terminal portion and the second terminal portion through a third pivot and a second further terminal portion terminating in a sliding arrangement on the lid in between the second pivot and the first end portion of the lid.

2. The kitchen appliance of claim 1, wherein the first pivot comprises a torsion spring arranged to force the lid from the chamber upon release of the lid from the wall arrangement.

3. The kitchen appliance of claim 1, wherein the hinge mechanism further comprises a further spring extending between a point on the arm in between the intermediate portion and the second terminal portion and the sliding arrangement.

4. The kitchen appliance of claim 3, wherein the further spring is at least one of a tension spring and a compression spring.

5. The kitchen appliance of claim 1, wherein the first pivot and the second pivot each are arranged to pivot in a single plane.

6. The kitchen appliance of claim 5, wherein the first pivot comprises a mounting bracket on the wall arrangement into which the first terminal portion is rotatably mounted.

7. The kitchen appliance of claim 5, wherein the second pivot comprises a further mounting bracket on the lid into which the second terminal portion is rotatably mounted.

8. The kitchen appliance of claim 1, wherein the third pivot is arranged to pivot in a single plane.

9. The kitchen appliance of claim 8, wherein the intermediate portion of the arm comprises a recess into which the first further terminal portion of the further arm is rotatably mounted to define the third pivot.

10. The kitchen appliance of claim 1, wherein the sliding arrangement comprises a pair of guide rails into which the second further terminal portion is mounted such that the second further terminal portion can slide between opposing ends of said pair of guide rails.

11. The kitchen appliance of claim 1, wherein the wall arrangement comprises a step below said lid, said step carrying a mounting arrangement including the first pivot such that said mounting arrangement is located in between said step and the lid.

12. The kitchen appliance of claim 1, wherein the lid is recessed within said wall arrangement when said lid is closed.

13. The kitchen appliance of claim 1, wherein the kitchen appliance is an electric kettle.

14. The kitchen appliance of claim 1, wherein upon release of the lid from the wall arrangement, the further arm rotates in a direction opposite to the arm.

* * * * *